United States Patent [19]
Yu et al.

[11] Patent Number: 5,798,860
[45] Date of Patent: Aug. 25, 1998

[54] IRIDIUM OXIDE FILM FOR ELECTROCHROMIC DEVICE

[75] Inventors: Phillip C. Yu, Pittsburgh; David L. Backfisch, Monroeville, both of Pa.; Nada A. O'Brien; Bryant P. Hichwa, both of Santa Rosa, Calif.

[73] Assignee: PPG Industries, Inc., Pittsburgh, Pa.

[21] Appl. No.: 782,992

[22] Filed: Jan. 14, 1997

Related U.S. Application Data

[60] Provisional application No. 60/010,078, Jan. 16, 1996.
[51] Int. Cl.$^6$ .................................................. G02F 1/153
[52] U.S. Cl. ........................................................ 359/273
[58] Field of Search ............................ 359/265, 273, 359/275

[56] References Cited

U.S. PATENT DOCUMENTS

| | | | |
|---|---|---|---|
| 3,973,829 | 8/1976 | Giglia | 350/160 R |
| 4,174,152 | 11/1979 | Giglia et al. | 350/357 |
| 4,258,984 | 3/1981 | Beni et al. | 350/357 |
| 4,335,938 | 6/1982 | Giglia et al. | 350/357 |
| 4,340,278 | 7/1982 | Beni et al. | 350/357 |
| 4,350,414 | 9/1982 | Takahashi et al. | 350/357 |
| 4,361,385 | 11/1982 | Huang et al. | 350/357 |
| 4,459,035 | 7/1984 | Nanya et al. | 368/241 |
| 4,478,991 | 10/1984 | Huang et al. | 526/287 |
| 4,482,216 | 11/1984 | Hashimoto et al. | 350/357 |
| 4,554,318 | 11/1985 | Rukavina | 525/118 |
| 4,609,703 | 9/1986 | Rukavina | 524/360 |
| 4,652,090 | 3/1987 | Uchikawa et al. | 350/357 |
| 4,670,334 | 6/1987 | Fujiwara et al. | 428/412 |
| 4,670,350 | 6/1987 | Rukavina | 428/520 |
| 4,715,691 | 12/1987 | Sata et al. | 350/357 |
| 5,011,582 | 4/1991 | Oshikawa et al. | 204/140 |
| 5,030,331 | 7/1991 | Sato | 204/38.3 |
| 5,180,524 | 1/1993 | Casilli et al. | 252/586 |
| 5,181,142 | 1/1993 | Asai et al. | 359/581 |
| 5,244,557 | 9/1993 | Defendini et al. | 204/192.29 |
| 5,327,281 | 7/1994 | Cogan et al. | 359/270 |
| 5,384,076 | 1/1995 | Sato et al. | 252/518 |
| 5,385,955 | 1/1995 | Tarshiani et al. | 522/31 |
| 5,471,338 | 11/1995 | Yu et al. | 359/273 |
| 5,471,554 | 11/1995 | Rukavina et al. | 385/131 |
| 5,520,851 | 5/1996 | Yu et al. | 252/518 |

FOREIGN PATENT DOCUMENTS

| | | |
|---|---|---|
| 0 098 416 | 8/1992 | European Pat. Off. |
| 3-42634 | 2/1991 | Japan. |
| 4-107427 | 4/1992 | Japan. |
| 4-306614 | 10/1992 | Japan. |
| 4-318525 | 11/1992 | Japan. |

OTHER PUBLICATIONS

J.J. Bessot, New Vacuum Deposition Techniques, *Metal Finishing*, Mar., 1980, pp. 21–26.

R.V. Stuart, *Vacuum technology, Thin Films, and Sputtering—An Introduction*, Academic Press, new York, 1983, pp. 123–131.

S.F. Cogan et al, *SPIE Institute Series*, vol. IS, No. 4, pp. 482–493, (1987), "The a–WO$_3$/a–IrO$_2$ Electrochromic System".

K.S. Kang et al, *J. Electrochem Soc.*, vol. 130, No. 4, pp. 766–769, (Apr. 1983), "Blue Sputtered Iridium Oxide Films (Blue SIROF's)".

R.D. Rauh et al, *Solid State Ionics*, 28–30 (1988), pp. 1707–1714, "Counter Electrodes in Transmissive Electrochromic Light Modulators".

S. Hackwood et al, *J. Electrochem So.*, vol. 128, No. 6, pp. 1212–1214, (Jun. 1981), "Volume Changes Induced by the Electrochromic Process in Sputtered Iridium Oxide Films".

*Primary Examiner*—Georgia Y. Epps
*Assistant Examiner*—Dawn-Marie Bey
*Attorney, Agent, or Firm*—William C. Mitchell; Irwin M. Stein; Frank P. Mallak

[57] ABSTRACT

Describes an electrochromically active iridium oxide film of iridium, oxygen and nitrogen, wherein the ratio of atomic oxygen to iridium is from 3.2:1 to 3.4:1 and the amount of nitrogen in the film is from 11 to 13 atomic percent. Describes also an electrochromic article, e.g., a plastic article such as a plastic lens, in which the aforedescribed iridium oxide film is paired with a cathodically coloring electrochromic film, such as tungsten oxide.

17 Claims, 7 Drawing Sheets

Cyclic Voltammogram at 20 mV/s

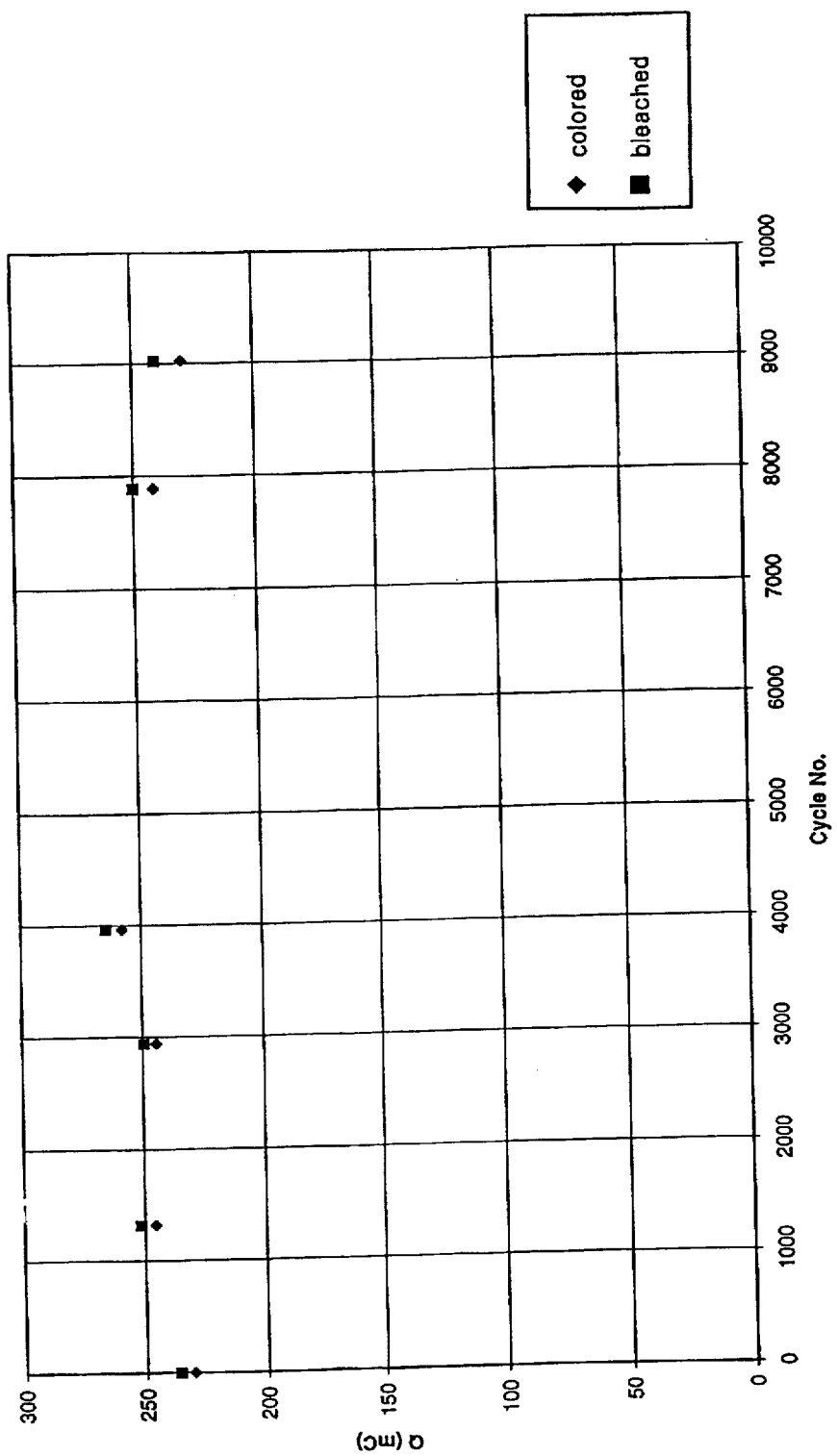

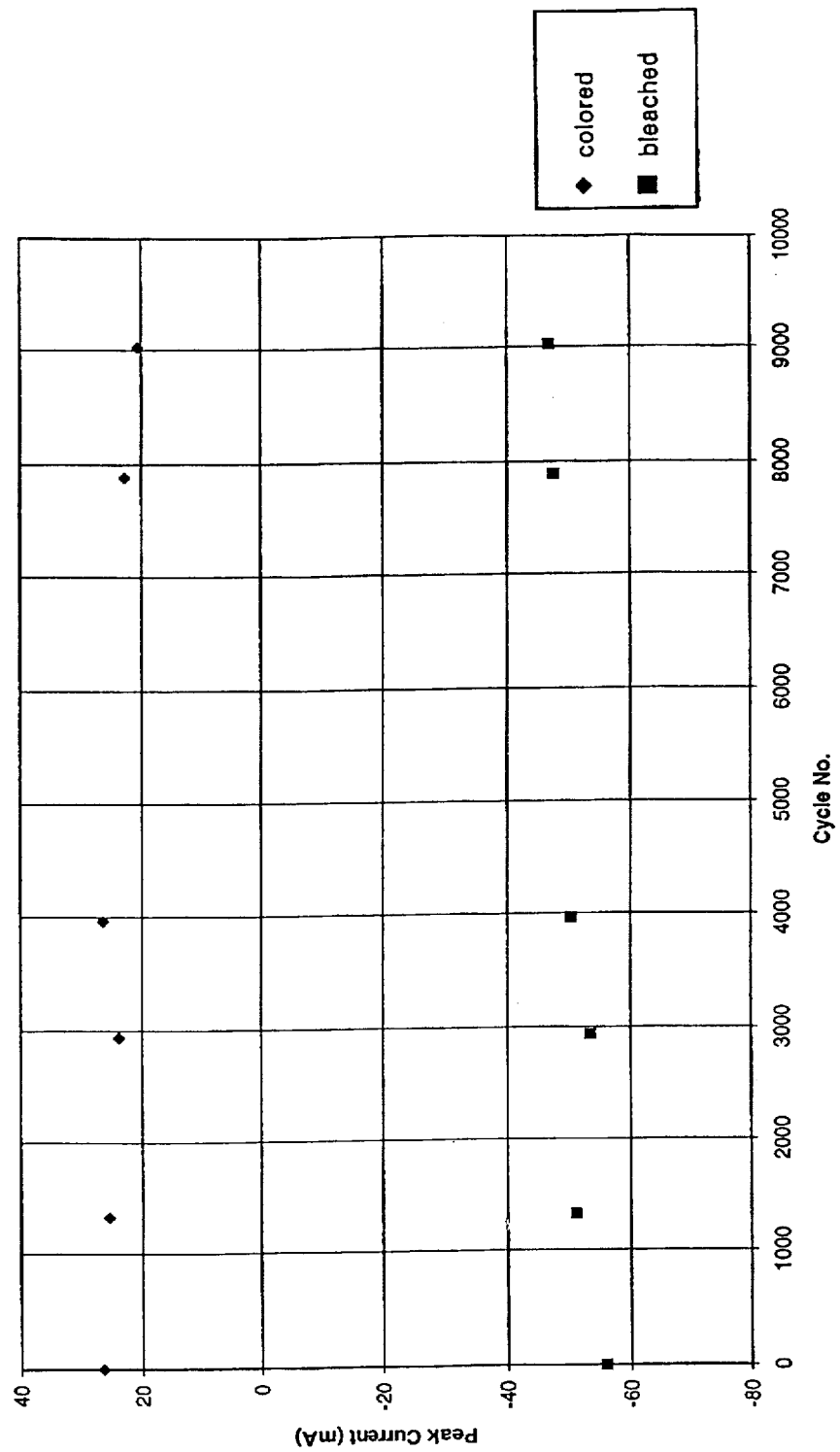

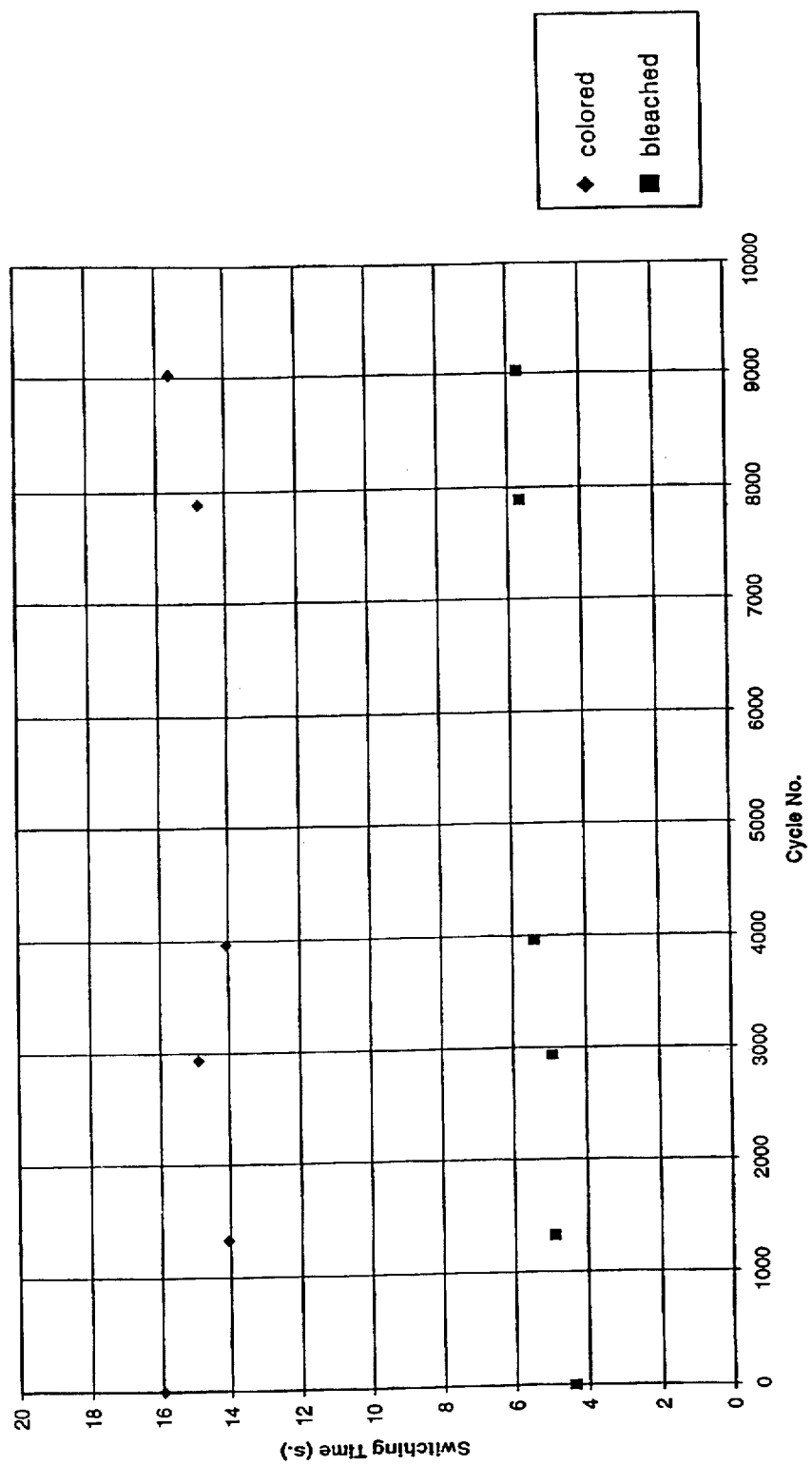

IRIDIUM OXIDE FILM FOR ELECTROCHROMIC DEVICE

This application claims the benefit of U.S. Provisional Application No. 60/010,078, filed Jan. 16, 1996.

BACKGROUND OF THE INVENTION

This invention relates generally to the art of electrochromic cells, and more particularly relates to the art of nitrogen-containing iridium oxide for use in electrochromic cells. Films of such nitrogen-containing iridium oxide may be used as a complementary electrochromic film and as the charge-balancing counter electrode in an electrochromic device.

Conventional electrochromic cells comprise a thin film of a persistent electrochromic material, i.e., a material responsive to the application of an electric field of a given polarity and sufficient voltage to change from a high-transmittance, non-absorbing state to a lower-transmittance, absorbing or reflecting state. The film of electrochromic material remains substantially in the lower-transmittance state after the electric field is discontinued. When an electric field of opposite polarity is applied to the electrochromic material, it returns to the prior high-transmittance state. The film of electrochromic material, which is both an ionic and electronic conductor, is in ion-conductive contact, preferably direct physical contact, with a layer of ion-conductive material. The ion-conductive material may be a solid, liquid or gel. The electrochromic film and ion-conductive layer are disposed between two electrodes to form a cell. In some applications, a complementary electrochromic film is used to form a cell, while in other applications an optically passive film or metal is used in place of the complementary electrochromic film to form the cell.

As voltage is applied across the two electrodes, ions are conducted through the ion-conducting layer. When the electrode adjacent to the film of electrochromic material is the cathode and the electrochromic material is cathodically coloring, application of an electric field to that material causes darkening of the film. Reversing the polarity of the electric field causes reversal of the electrochromic properties, and the film reverts to its high transmittance state. Conventionally, a cathodically coloring electrochromic material, usually tungsten oxide or compounds thereof, is deposited on a glass substrate that has been previously coated with an electroconductive film such as tin oxide or indium/tin oxide (ITO) to form one electrode. In some electrochromic devices, the counter electrode has been a carbon-paper structure backed by a similar tin oxide or indium/tin oxide coated glass substrate or metal plate.

Schiavone describes the deposition of electrochromic iridium oxide by reactive sputtering of an iridium target in the Journal of the Electrochemical Society, Vol. 128 No. 6 pp. 1212–1214 (June 1981). Iridium oxide films are deposited by reactive radio frequency sputtering of an iridium target in pure oxygen to deposit a film in the fully colored state.

Kang and Shay describe blue sputtered iridium oxide films in the Journal of the Electrochemical Society, Vol. 130, No. 4, pp. 766 et seq. (April 1983). The properties are compared with those of black sputtered iridium oxide films and the properties of anodically grown iridium oxide films. The blue iridium oxide films are deposited by reactive direct current sputtering of iridium in a 80/20 argon/oxygen gas mixture onto glass substrates held at 238° K. The process used by the authors include target pre-sputtering for 15 minutes in pure argon followed by 25 minutes of in-situ substrate cleaning and another pre-sputtering step for 10 minutes in the argon/oxygen gas mixture used for the actual coating. As electrochromic display electrodes, the blue sputtered iridium oxide films are described as having an improved open-circuit bleached state and written-state memory, as well as an improved appearance.

Cogan et al describe electrochromic devices in SPIE, Vol. 823, No. 482 et seq. (1987) comprising indium/tin oxide (ITO) coated glass sheets, electrochromic films of tungsten oxide and iridium oxide, and a polymer electrolyte of poly-2-acrylamido-2-methylpropane-sulfonic acid (polyAMPS).

U.S. Pat. No. 4,350,414 to Takahashi et al discloses a solid state electrochromic device comprising a pair of electrodes, an oxidizable film of iridium hydroxide and/or nickel hydroxide, a reducible film of tungsten oxide and/or molybdenum oxide, and an insulating film between said films that allows proton conduction, but prohibits electron conduction, e.g., tantalum oxide, zirconium oxide, niobium oxide, alumina, magnesium fluoride, silicon oxide, titanium oxide, hafnium oxide or yttrium oxide.

U.S. Pat. No. 5,327,281 to Cogan et al describes a solid polymer electrolyte for an electrochromic device which is laminated between an amorphous tungsten trioxide coated indium/tin oxide coated glass substrate and an iridium oxide coated indium/tin oxide coated glass substrate.

DESCRIPTION OF THE DRAWINGS

For a better understanding of the present invention, reference may be made to the accompanying figures in which:

FIG. 5 is a chart of Charge Transferred vs. Cycle No. for the electrochromic device of Example 2;

FIG. 6 is a chart of Peak Current vs. Cycle No. for the electrochromic device of Example 2; and FIG. 7 is a chart of Switching Time vs. Cycle No. for the electrochromic device of Example 2.

DESCRIPTION OF THE INVENTION

Figure 1:
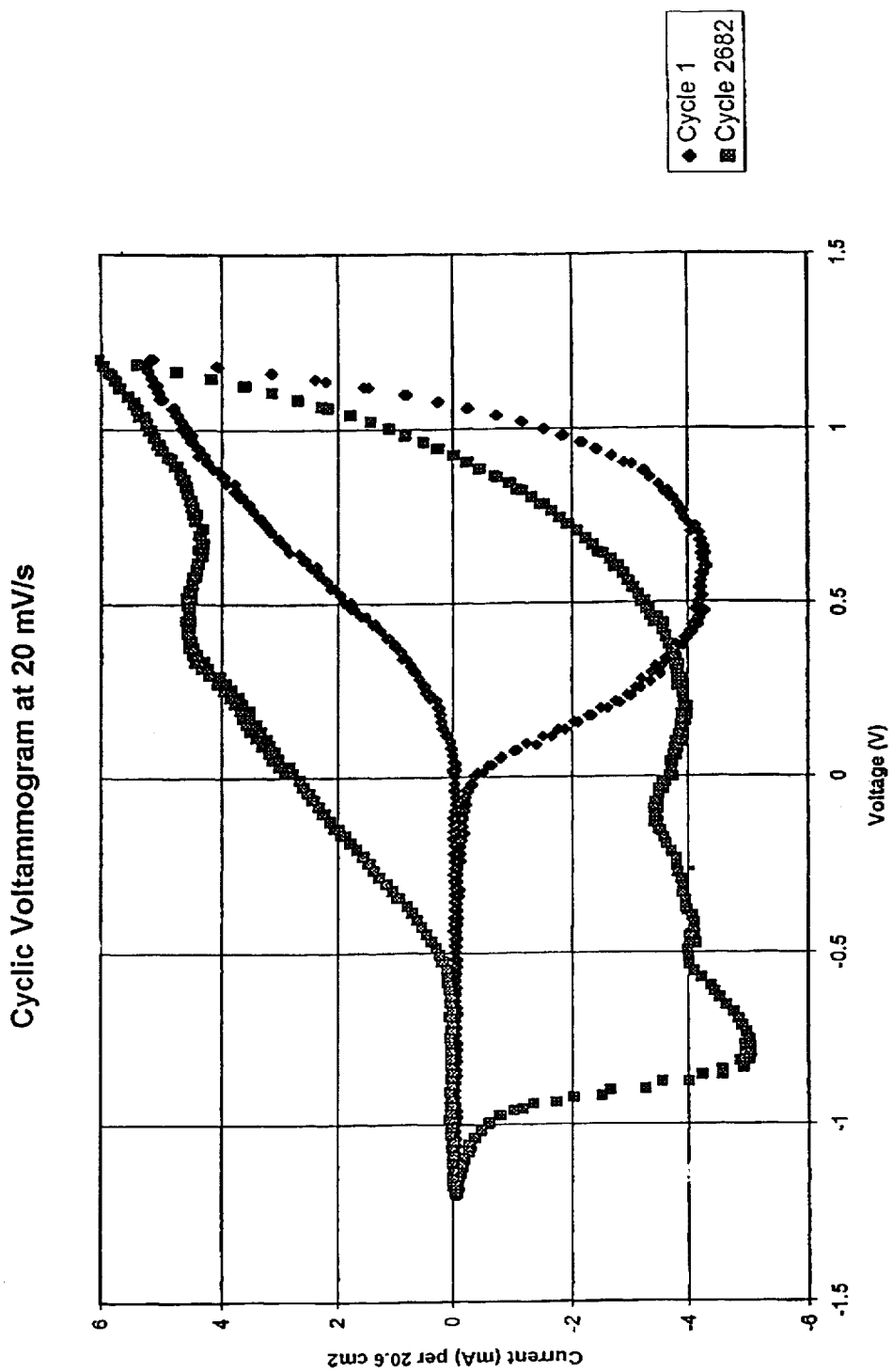
FIG. 1 is a cyclic voltammogram of an electrochromic device prepared with the iridium oxide film of the comparative example.

Other than in the operating examples, or where otherwise indicated, all numbers expressing quantities, ratios, ranges, etc. used herein are to be understood as modified in all instances by the term "about".

The present invention is directed to electrochromically active nitrogen-containing iridium oxide films having a particular ratio of oxygen to iridium and a particular amount of nitrogen. More particularly, the present invention is directed to electrochromically active nitrogen-containing iridium oxide films of certain thicknesses and densities. Such films may be used in transparent and non-transparent electrochromic devices.

In our copending application Ser. No. 08/337,783, filed Nov. 14, 1994, there are described iridium oxide films containing a stabilizing amount of nitrogen, i.e., an amount of nitrogen that is sufficient to prevent a significant change in transmittance after the film is electrochemically precharged. It has now been discovered that certain nitrogen-containing iridium oxide films are particularly useful for enhancing the stability of the optical window (the difference in luminous transmittance between the low transmittance state (colored state) and the high transmittance state (bleached) state), charge transfer (the amount of charge in milliCoulombs transferred between the electrochromic layers), electrochemistry (reversible electrolytic oxidation and reduction by an applied field), cell resistance, i.e., a stable peak current over the lifetime of the cell when a constant voltage is applied, and switching times (the time required to change from the colored to the bleached state) of an electrochromic device in which the aforedescribed iridium oxide film is incorporated.

Such particularly useful iridium oxide films have been found to contain nitrogen in amounts of from about 11 to 13 atomic percent. The ratio of atomic oxygen to iridium in such films is from 3:1 to 4:1, preferably from 3.2:1 to 3.4:1, and more preferably is 3.3:1. The thickness of the film in the electrochromic device can range from 290 to 430 Angstroms, preferably from 300 to 400 Angstroms, and most preferably is 320 Angstroms. The density of the film can range from 50 to 70 percent of the theoretical value of iridium dioxide (11.67 grams/cc) and preferably ranges from 55 to 65 percent, and more preferably is 60 to 65 percent.

The aforedescribed iridium oxide film may be deposited by sputtering an iridium target within a sputtering chamber containing a substrate on which the film is to be deposited under conditions such that nitrogen in the oxygen-containing reactive gas is incorporated into the iridium oxide film. No extraordinary measures are required for the deposition process, such as the maintenance of low temperatures or extensive preconditioning of the iridium sputtering target.

The aforedescribed nitrogen-containing iridium oxide films have been found to exhibit desirable properties when utilized as a complementary electrochromic film in an electrochromic cell and in a solid-state electrochromic device. When nitrogen-containing iridium oxide films of the present invention are electrochemically precharged (reduced), such films are observed to be more stable upon exposure to air than iridium oxide films containing less nitrogen and possessing a lower atomic oxygen to iridium ratio. For example, reduced films of the present invention do not self darken upon exposure to air while reduced films containing less than 10 atomic percent nitrogen and an atomic oxygen to iridium ratio of less than 3:1 do darken upon exposure to air. Such films are thus resistant to oxidation when exposed to air. Moreover, high deposition rates of 100 Angstroms/minute for nitrogen-containing iridium oxide films have been obtained.

The substrate for the iridium oxide film of the present invention can be in one embodiment a light transmitting solid material, particularly a transparent material such as glass or plastic, preferably a transparent material suitable for producing lenses used in eyewear, such as lenses prepared from synthetic organic optical resins. Alternatively, the substrate can be a non-transparent solid material. The transparent lens may have a conventional refractive index (1.48–1.5), a relatively high refractive index (1.60–1.75), or a mid-range refractive index (1.55–1.56), depending on the end use; or the lens may have a refractive index anywhere between about 1.48 and about 1.75, e.g., from 1.50 to 1.66.

Synthetic polymer substrates that may be used as a lens material include, but are not limited to: thermoplastic polycarbonates, such as the carbonate-linked resin derived from bisphenol A and phosgene, which is sold under the trademark LEXAN; polyesters, such as the material sold under the trademark, MYLAR; poly(methyl methacrylates), such as the material sold under the trademark, PLEXIGLASS; and polymerizates of a polyol(allyl carbonate) monomer, especially diethylene glycol bis(allyl carbonate), which is sold under the trademark CR-39. Copolymers of the aforedescribed monomers/resins may also be used as a lens material. These and other transparent and non-transparent polymeric substrates known in the art for use for various optical and non-optical applications may be used as a substrate for the nitrogen-containing iridium oxide film.

The substrate on which the iridium oxide film of the present invention is deposited, e.g., a transparent substrate, is generally not electrically conductive. When preparing an electrochromic device, the substrate is preferably first coated with an electroconductive film. The electroconductive film may be any of those known in the art that are used as electroconductive films in electrochromic devices. Such films are typically transparent thin films of metal or metal oxide, e.g., fluorine-doped tin oxide or tin-doped indium oxide, commonly referred to as ITO (indium/tin oxide), preferably ITO comprising a weight ratio of about 90:10 indium to tin. Other materials such as antimony-doped tin oxide and aluminium-doped zinc oxide may also be used as the electroconductive film.

The electroconductive film for the substrate on which the iridium oxide film is to be deposited, preferably has a sheet resistance in the range of from 10 to 60 ohms per square, preferably from 20 to 50 ohms per square, more preferably from about 30 to 40 ohms per square, for desired electrical conductivity and overall transmittance. Such electroconductive film thickness is preferably in the range of 1300 to 3900, preferably 2100 to 2200 Angstroms, and more preferably is 2150 Angstroms.

The electroconductive film may be deposited by a variety of methods known in the art so long as the substrate is not deleteriously affected by such method. High temperature pyrolytic methods may be used to deposit electroconductive films on glass, but such methods generally are not suitable for lower melting polymeric substrates. A preferred method for depositing the electroconductive film, such as ITO, on polymeric substrates is direct current (DC) sputtering, particularly DC magnetron reactive sputtering (MSVD), such as the MetaMode® sputtering system, which is a high deposition rate, low temperature process that is described in U.S. Pat. Nos. 4,851,095 and 5,225,057, and copending U.S. patent application Ser. No. 08/293,129 filed Aug. 19, 1994, the disclosures of which are incorporated herein by reference. Vacuum web coating with a chilled drum is another method of coating ITO on plastic substrates.

In the aforesaid '095 and '057 patents, the substrate to be coated is rotated alternately through a high rate metallic sputtering zone and an energetic reactive plasma. The DC magnetron sputtering cathodes operate in a partial pressure separation regime in combination with a rotary cylindrical workpiece transport system. Using such techniques, ITO films having a visible transmittance of greater than 80% and a sheet resistance of 10–60 ohms/square may be prepared at temperatures ranging from 20° to 100° C., depending on the substrate.

The adhesion of electroconductive metal oxide films to plastic substrates is generally not adequate for environmental durability and long-term cycling (coloring/bleaching cycles) of electrochromic devices. In such cases, an adhesion promoting polymeric primer is preferably disposed at the interface of the substrate and the electroconductive film to improve the adhesion of the electroconductive film to the surface of the plastic substrate. In addition, the polymeric primer aids in preventing crazing and/or cracking of the plastic substrate and the electroconductive film. Primers for polymeric substrates prepared from an optical resin comprising CR-39® allyl diglycol carbonate monomer may be an acrylate copolymer, preferably a copolymer of acrylic acid and a substituted acrylate, such as cyanoethylacrylate, hydroxyethylacrylate, methyl methacrylate and mixtures of such substituted acrylates, as described in U.S. Pat. Nos. 5,471,338 and 5,471,554. Primers may also be organosilane coatings such as described in U.S. Pat. No. 5,385,955 and copending U.S. patent application Ser. No. 08/766,549 of Carol Knox.

The primer is preferably applied to the plastic substrate surface as a solution of acrylate or organosilane monomers in an appropriate solvent, e.g., an organic solvent or an aqueous dilution of an organic solvent, by dip, flow or other conventional application techniques. The solvent is then evaporated and the polymeric primer cured at elevated temperatures, typically 180° to 248° F. (80° to 120° C.) for 2 to 16 hours. The acrylate monomer solution will generally include an initiating amount of a free-radical initiator, such as azobisisobutyronitrile, a catalyst, such as dibutyltindilaurate (DBTDL) or uranyl nitrate, to cure the primer and may also contain cycloaliphatic diepoxides for cross-linking the acrylate copolymer. The organosilane coating solution will generally include a leveling amount of a surfactant, i.e., an amount sufficient to allow the coating to spread evenly on the surface of the substrate, a solvating amount of a low molecular weight alcohol, i.e., an amount sufficient to solubilize the organosilane monomers in the coating solution, a catalytic amount of a water-soluble acid, i.e., an amount sufficient to result in the polycondensation of the silane monomers, and water in an amount sufficient to form hydrolysates of the silane monomers and dissolve the catalytic amount of water-soluble acid.

The organic solvent used for the acrylate monomer solution may be cyclohexanone, 1-propanol, 1-butanol, acetone, and mixtures of such solvents. A preferred organic solvent is 1-propanol. A method of applying the primer is to dip the plastic substrate into the primer monomer solution, remove the substrate from the solution, and dry and cure the resultant coating of primer on the substrate. Subsequently, the primer may be polished off the surface not coated with an electroconductive film. Another method of applying the primer to the plastic substrate is to spin coat the monomer solution onto one surface of the substrate, and dry and cure the resulting primer coating. The thickness of the primer coating is preferably in the range of from 0.01 to 10.0 microns.

The iridium oxide film of the present invention may be deposited by radio frequency (rf) or direct current (DC) magnetron sputtering on the chosen substrate, e.g., an optical plastic having a primer coating and an electroconductive metal oxide film coating on the primer coating. The sputtering reactive gas comprises oxygen, nitrogen (or a nitrogen-containing gas) and an inert gas such as argon, neon, krypton or xenon. Argon is preferred as the inert gas for reasons of cost. The nitrogen partial pressure is preferably equal to or greater than the inert gas, e.g., argon, partial pressure. In addition, high partial pressures of oxygen in the system are used. Preferably, the oxygen partial pressure is 20 to 80 percent of the total gas pressure. The flow rate of oxygen to nitrogen is preferably from about 2–10:1, e.g., 4–8:1. It has been found that the amount of nitrogen in the iridium oxide film increases with an increase in the relative amount of oxygen, vis-a-vis, inert gas, e.g., argon.

As with the electroconductive film, the nitrogen-containing iridium oxide electrochromic film may be deposited using the MetaMode® system, which includes a DC magnetron reactive sputter deposition system where the reactive gas is separated from the non-reactive gas by a low pressure region. The deposition of metal species takes place on a substrate that translates and/or rotates between the sputtering target deposition region and the reactive gas plasma region. The reactive gas region consists of a positively biased electrode so that an intense plasma of reactive ion species is formed and the ions bombard the freshly deposited metal on a substrate thereby forming compounds of the metal, such as oxides, nitrides, oxynitrides, or combinations thereof. The system may be described simply as sequential deposition-reaction-deposition-reaction, etc. until the desired film thickness is obtained.

Total system gas pressures within the system are in the range of 5–100, e.g., 20–75, milliTorr. Reactive gas partial pressures within the system are in the range of 7–40 milliTorr. The nitrogen or nitrogen-containing gas may be introduced at any suitable location in the MetaMode® system, e.g., the deposition zone, the reaction zone or any inactive deposition zone. Typical cathode power and ion source current are within the ranges of 1–5 kilowatts and 1–3 amperes respectively. Optimum conditions may be determined through a statistical design of experiment for nitrogen-containing iridium oxide films.

Sputtering of iridium oxide is accomplished using an iridium target of a size and shape appropriate for the size and shape of the substrates to be coated, and spaced a suitable distance, e.g., 3–6 inches (7.62–15.24 centimeters) from, but in close association with, the substrate to deposit a uniform coating. The sputtering chamber is preferably evacuated to a pressure less than $10^{-5}$, preferably less than $10^{-6}$, Torr before introducing the reactive gas composition of the sputtering atmosphere. The deposition of nitrogen-containing iridium oxide is performed by sputtering the iridium target and contacting the sputtered iridium with a reactive gas, i.e., in an oxidizing atmosphere, preferably comprising oxygen and a nitrogen-containing gas, at a chamber pressure in the range of about 5–100, e.g., 40–75 milliTorr, depending on the particular sputtering equipment used.

It has been found in accordance with the present invention that when nitrogen is present in the iridium oxide film, the film is more stable against a loss in transmittance when electrochemically reduced and then exposed to air, e.g., there is a minimum amount of self-darkening or bleaching over a short period of time, e.g., 30 minutes. Stated differently, the nitrogen-containing iridium oxide film exhibits significant improvement in retaining a high bleach state optical transmittance. In addition, it has been found that when the nitrogen-containing iridium oxide film is electrochemically reduced, it does not again oxidize when exposed to air.

The reactive gas atmosphere in the sputtering chamber contains a sufficient amount of nitrogen to result in the incorporation of the desired amount, e.g. 11 to 13 atomic percent of nitrogen in the iridium oxide film, i.e., sufficient nitrogen to prevent a significant change in transmittance after the film is electrochemically precharged. Stated differently, the amount of nitrogen incorporated into the iridium oxide film is sufficient to stabilize the film such that its transmittance is not significantly altered during electrochemical reduction. Nitrogen in the sputtering chamber atmosphere may be introduced either as pure nitrogen gas or in the form of air or other nitrogen-containing gas compositions, for example ammonia. The nitrogen source may be charged separately and continuously to the chamber or as part of the oxygen source that provides the oxidizing atmosphere.

The iridium oxide film as deposited preferably comprises 11 to 13 atomic percent nitrogen. The thickness of the nitrogen-containing iridium oxide film is preferably in the range of from 290 to 430 Angstroms, more preferably, from 300 to 400, and most preferably, 320 Angstroms. Such films may be analyzed by Rutherford Backscattering Spectrometry (RBS), which provides analytical results as atomic number density (atoms/cm$^2$) and which is referred to herein as atomic percent. In one embodiment, the films have been found to comprise 66 to 68 atomic percent oxygen and 11 to 13 atomic percent nitrogen, the ratio of atomic oxygen to iridium being in the range of about 3.2:1 to 3.4:1, and preferably 3.3:1.

The amount of nitrogen incorporated in the iridium oxide film can be controlled by varying the nitrogen flow rate (or partial pressure) while other process conditions are kept the same. Another way of controlling the amount of nitrogen incorporated into the film is by varying the relative oxygen to inert gas, e.g., argon, flow rate ratio at a constant nitrogen flow rate. At present, the precise chemical nature of the nitrogen in the iridium oxide film has not been established. It is postulated that the nitrogen is present as elemental nitrogen, or some form of a nitride or oxynitride.

The amount of nitrogen in the iridium oxide film has been found to affect the electrochromic characteristics of the film. The switching speed, the coloring efficiency (defined as the change in optical density per charge density), the charge capacity, and the range of coloring/bleaching are all found to vary depending on the level of atomic nitrogen incorporated in the film.

When radio frequency (rf) magnetron sputtering is used to deposit the iridium oxide film, the power is also selected with regard to the sputtering equipment, and may be in the range of 100 to 135 watts, more preferably about 125 watts, for a target area of about 42 square centimeters during the deposition period. Power density is preferably in the range of 1 to 5, more preferably 2 to 4, most preferably 2.5 to 3.5, watts per square centimeter. The target and chamber are usually water cooled throughout the rf magnetron sputtering coating deposition process. In the MetaMode® sputtering system, the target alone is usually water cooled.

The nitrogen-containing iridium oxide film coated on the ITO coated substrate may be electrochemically pre-charged in an acid bath, such as 0.1 Molar hydrochloric acid or 0.1 Molar sulfuric acid, using either galvanostatic or potentiostatic techniques. In one embodiment, the cell configuration has three electrodes; namely a working electrode (WE), a reference electrode (RE), and a counter-electrode (CE). The working electrode is the nitrogen-containing iridium oxide film; the reference electrode is a standard calomel electrode (SCE); and the counter-electrode is platinum foil having an area of 25 square centimeters.

Using potentiostatic conditions with an applied voltage in the range of from −0.5 to −0.1 volts versus a standard calomel electrode, the amount of charge inserted and removed is in the range from about 13–40 mC/cm$^2$.

The electrochemical reduction has been conducted also under galvanostatic conditions including an applied current of about $1.5 \times 10^{-3}$ amperes and a voltage limit set at 1.5 volts. The amount of charge inserted and removed under these conditions is about 23 millicoulombs per square centimeter (mC/cm$^2$). A coulometer wired in series to the WE can be used to measure the charge. The accumulated charge may be in the range of about 1 to 40, and preferably is from 10 to 35 millicoulombs per square centimeter.

In accordance with an embodiment of the present invention, the nitrogen-containing iridium oxide film that is coated on the ITO coated substrate can be paired with a complementary electrochromic film that is coated on an ITO coated substrate to prepare an electrochromic device. Complementary electrochromic materials that may be used with the nitrogen containing iridium oxide film are oxides of molybdenum (MoO$_3$), tungsten (WO$_3$), vanadium (V$_2$O$_5$), niobium (Nb$_2$O$_5$), titanium (TiO$_2$), chromium (Cr$_2$O$_3$), praseodymium (PrO$_2$), and ruthenium (RuO$_2$). Tungsten oxide and compounds of tungsten oxide are preferred. In addition, ternary metal oxides and tungsten bronzes, such as MOWO$_3$, NbWO$_3$, K$_{1-x}$WO$_3$ and Na$_{1-x}$WO$_3$, wherein x is less than 1 may be used.

Tungsten oxide may be deposited on a substrate, e.g., an ITO coated plastic substrate, by thermal evaporation of tungsten oxide, but is preferably deposited by direct current (DC) magnetron sputtering of tungsten in a rare gas/oxygen atmosphere at high total gas pressures (exceeding 20 milliTorr) utilizing equipment such as the MetaMode® sputtering system described in U.S. Pat. Nos. 4,851,095 and 5,225,057. The thickness of the electrochromic, e.g., tungsten oxide, film is preferably in the range of 2400 to 5200 Angstroms, more preferably 2500 to 3900, e.g., 2600 Angstroms. The electrochromic film, e.g., tungsten oxide, is in the clear (high transmittance) state as deposited. In accordance with the present invention, the electroconductive film, e.g., indium tin oxide, on which the tungsten oxide film is deposited will preferably have a thickness of from 1200 to 3900, e.g., 1200 to 2600, and most preferably 1250 to 1350, Angstroms.

After each of the two substrates, e.g., plastic substrates, have been optionally primed, coated with electroconductive film and further coated with an electrochromic film, the pair are assembled to form a cell with the electrochromic films in a face to face relationship. The cell may be produced by preferably disposing a preformed solid sheet of an ion-conducting polymer between the two half cells and laminating the resultant assembly in an autoclave. The layer of ion-conducting material, preferably an ion-conducting polymer, bonds with both electrochromic surfaces to form a laminated article.

In accordance with a preferred embodiment of the present invention, the ion-conducting polymer electrolyte is a proton-conducting polymer. Homopolymers of 2-acrylamido-2-methylpropanesulfonic acid (AMPS®—a registered trademark of Lubrizol) and copolymers of AMPS with various monomers may be utilized in the form of preformed sheets which are laminated between the substrates, or in the form of a liquid reaction mixtures of monomers which are cast and cured in place between the substrates. A preferred proton-conducting polymer electrolyte in accordance with the present invention is a copolymer of AMPS and N,N-dimethylacrylamide (DMA), preferably cast and cured in place. Preferred copolymers of AMPS and DMA are prepared from AMPS and DMA monomers in a molar ratio range of about 1:3 to 1:2. The thickness of the polymer electrolyte is preferably in the range of 0.001 to 0.025 inch (0.0254 to 0.625 millimeter), more preferably 0.005 to 0.015 inch (0.127 to 0.381 millimeter).

The AMPS/DMA copolymer proton-conductive electrolyte is preferably cast in place as a solution of monomers in 12-methyl-2-pyrrolidinone (NMP) and water. The monomer solution comprises a photoinitiator to polymerize the monomers upon exposure to actinic radiation, preferably ultraviolet (UV) light. Preferred UV initiators include benzoin methyl ether and diethoxyacetophenone. The monomer solution may be poured between two separate electroconductive metal oxide/electrochromic metal oxide coated polymer lens substrates assembled together with a 0.005 to 0.025 inch (0.381 to 0.508 millimeter) TEFLON® spacer held in place with a commercially available sealant, e.g. Torr Seal® from Varian Vacuum Products. Curved lenses are typically about 70 millimeters in diameter and 1 to 20 millimeters thick. For a pair of curved lens substrates, the monomer solution may be poured onto the concave surface of one lens substrate and the convex surface of the other lens substrate placed in contact with the monomer solution, thus forming the monomer solution into a thin film between the lens substrates. Exposure to UV light sufficient to cure the polymer electrolyte is typically about 30 minutes for a mercury lamp and about one to 3 minutes for a xenon lamp. While the aforesaid discussion is directed to curved substrates, the nitrogen-containing iridium oxide film of the present invention may also be applied to flat substrates for use in applications other than lenses.

In addition to the above-described ion-conducting polymer electrolytes, other materials, as for example materials comprising hydrogen uranyl phosphate or polyethylene oxide/ $LiClO_4$, may also be employed. Also, inorganic films such as $LiNbO_3$, $LiBO_3$, $LiTaO_3$, $LiF$, $Ta_2O_5$, $Na_2AlF_6$, $Sb_2O_5 \cdot nH_2O+Sb_2O_3$, $Na_2O \cdot 11Al_2O_3$, $MgF_2$, $ZrO_2$, $Nb_2O_5$ and $Al_2O_3$ are contemplated for use as the electrolyte material.

The resultant electrochromic lens is generally crackfree with insignificant haze (0.3 to 0.4%). The electrical connections to the electrochromic device are preferably made with electrically conductive bus bars. The optical transmittance of the finished lens at 550 nanometers is typically about 75 percent or higher in the bleached state and has a minimum of about 10 percent in the darkened state in the voltage range of from about +1.5 to −1.5 volts for a charge in the range of about 10 to 20 millicoulombs per square centimeter (mC/cm$^2$). The charge capacity of such films may range from less than 3 to more than 30 millicoulombs per square centimeter. For electrochromic articles other than eyewear, the transmittance in the bleached state may be lower and in the darkened state may be higher or lower.

The present invention is more particularly described in the following examples which are intended as illustrative only since numerous modifications and variations therein will be apparent to those skilled in the art.

EXAMPLE 1

A nitrogen-containing film of iridium oxide was deposited on a plastic substrate prepared from a resin composition comprising CR-39® allyl diglycol carbonate monomer using the DC magnetron sputtering system described in U.S. Pat. No. 4,851,095 and 5,225,057. Prior to the deposition of the nitrogen-containing iridium oxide film, the plastic substrate was primed with an organosilane hardcoat and coated with an electroconductive layer of ITO having a thickness of about 2600 Angstroms. An iridium metal target of 12.75× 5.25×0.25 inches (32.39×13.34×0.64 centimeters) was used. The substrate had an area of 20.6 square centimeters. The deposition process conditions used were as follows:

| | |
|---|---|
| Cathode power: | 1 Kwatt |
| Sputtering gas: | Argon @50 sccm |
| Ion source current: | 1 Ampere |
| Reaction Gas: | Oxygen @950 sccm |
| Nitrogen Gas Flow: | 220 sccm |
| Total Gas Pressure: | 40 mTorr |
| Drum Diameter: | 34 inches (86.3 cm) |
| Drum Rotation: | 100 rpm |
| Target-to-Substrate Distance: | 3 inches (7.6 cm) |
| Iridium Oxide Film Thickness: | 320 Angstroms |
| Deposition Rate: | 100 Angstroms/min |

(sccm = standard cubic centimeters/minute)

EXAMPLE 2

The procedure used for Example 1 was followed except that the plastic substrate was coated with an electroconductive layer of ITO having a thickness of about 2150 Angstroms.

COMPARATIVE EXAMPLE

The procedure used for Example 1 was employed except that the following deposition process conditions were used:

| | |
|---|---|
| Cathode power: | 1 Kwatt |
| Sputtering gas: | Argon @100 sccm |
| Ion source current: | 1 Ampere |
| Reaction Gas: | Oxygen @850 sccm |
| Nitrogen Gas Flow: | 110 sccm |
| Total Gas Pressure: | 40 mTorr |
| Drum Diameter: | 34 inches (86.3 cm) |
| Drum Rotation: | 100 rpm |
| Target-to-Substrate Distance: | 3 inches (7.6 cm) |
| Iridium Oxide Film Thickness: | 440–480 Angstroms |
| Deposition Rate: | 100 Angstroms/min |

(sccm = standard cubic centimeters/minute)

EXAMPLE 3

Part A

The electrochromic films of Examples 1, 2 and the Comparative Example were analyzed for nitrogen, iridium and oxygen using Rutherford Backscattering Spectrometry. The reported results are listed in Table 1. The photopic transmittance ($T_p$), i.e. the transmittance integrated over the visible spectrum, of the Examples and the Comparative Example films was measured with a BKY Gardner, Haze-Gard Plus Model instrument in the colored or as deposited state and in the leached state. The bleached state was attained by electrochemically reducing the film in 0.1M (Molar) hydrochloric acid using a three electrode potentiostatic technique and applying a −0.25 V versus the saturated calomel reference electrode to the sample (working electrode). A 25 square centimeter platinum foil was used as a counter-electrode and the amount of charge injected was 680 millicoulombs (33 millicoulombs/cm$^2$). The results of these tests are listed in Table 1.

Part B

Electrochromic (EC) devices were prepared using the coated plastic substrates of Examples 1, 2 and the Comparative Example. The devices were prepared by laminating each iridium oxide coated substrate to a tungsten oxide coated polymer substrate via an ion-conducting polymer. The polymer substrate was the same as used in Example 1 and was coated with the same organosilane primer used in Example 1. The ITO layer beneath the tungsten oxide film and the tungsten oxide film were deposited using the DC magnetron sputtering system described in Example 1. The ion-conducting polymer was a 0.015 inch (0.38 millimeter) thick layer of an AMPS/DMA copolymer prepared from a reaction mixture comprising by weight 28 percent AMPS, 47 percent DMA, 6 percent 1-methyl-2-pyrrolidinone (NMP) and 19 percent water. The thicknesses of the various layers are listed in Table 2. The resulting EC devices were cycled using a square wave potential cycle from +1.2V to −1.2V, 90 seconds to color and 60 seconds to bleach. The stability of each of the devices after a certain number of color/bleach cycles was observed and reported in Table 2.

Part C

Figure 2:
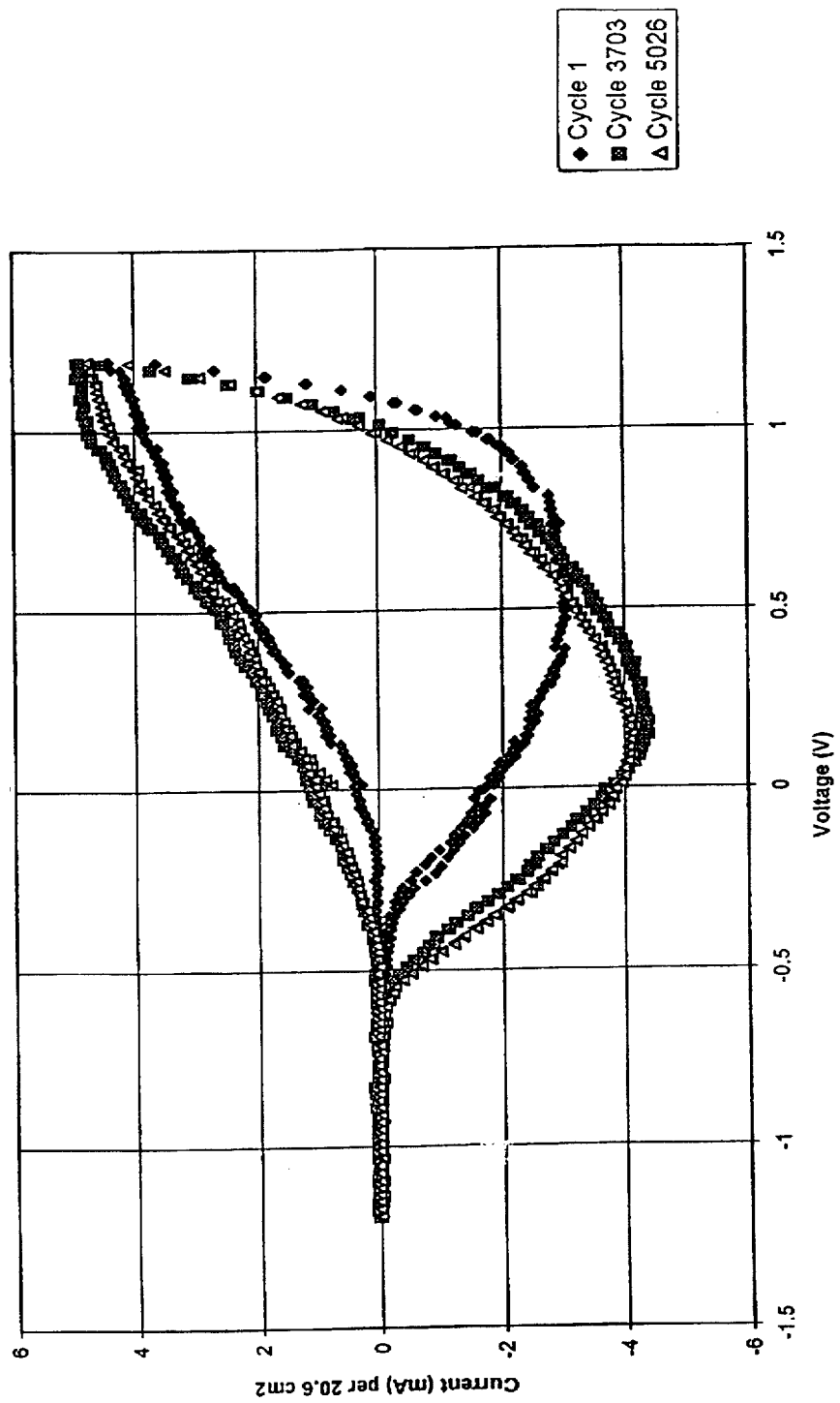
FIG. 2 is a cyclic voltammogram of an electrochromic device prepared with the iridium oxide film of Example 1.
Figure 3:
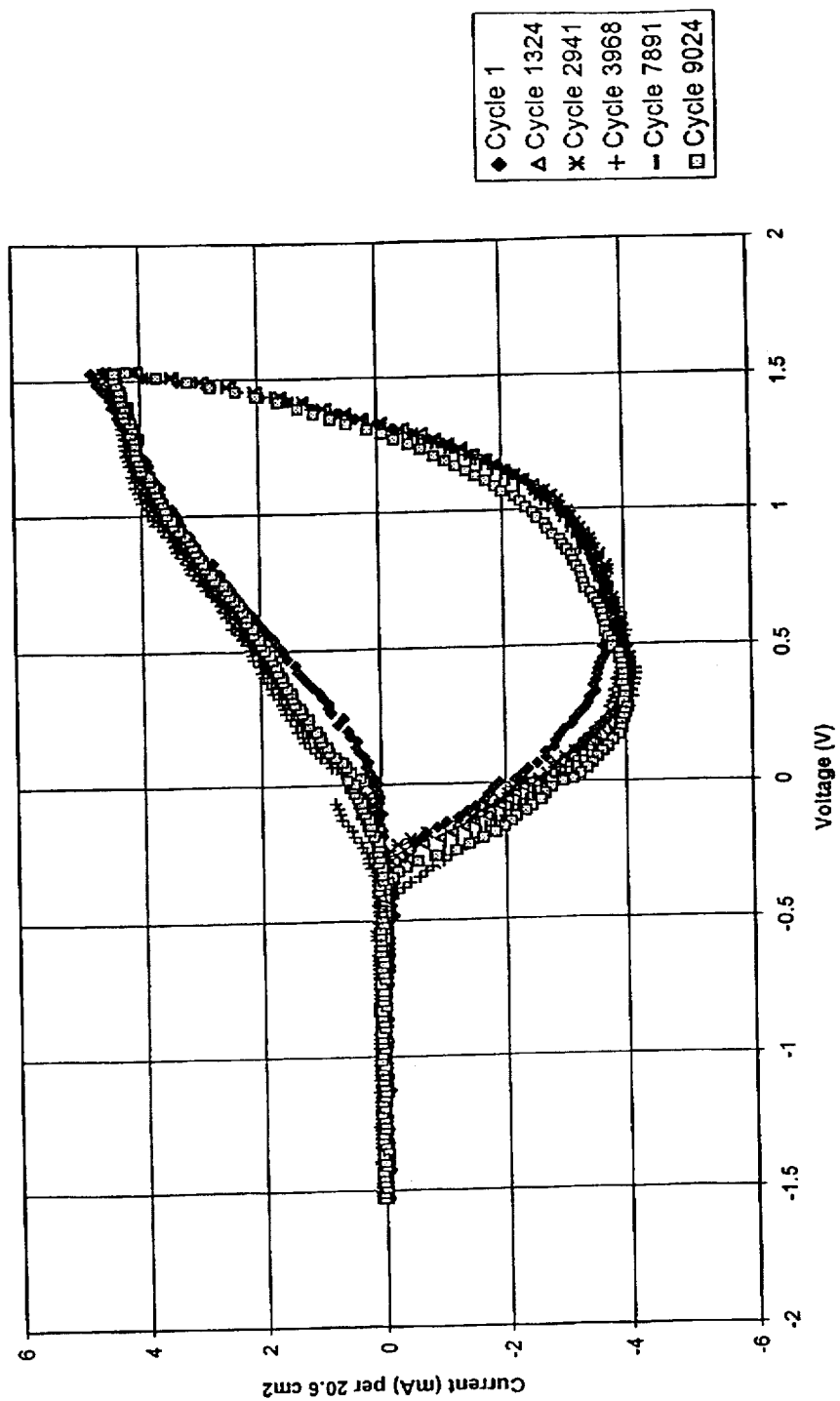
FIG. 3 is a cyclic voltammogram of an electrochromic device prepared with the iridium oxide film of Example 2.

Cyclic voltammetry (CV) was performed to analyze the EC devices prepared in Part B using a triangular wave potential cycle. The voltage range was from −1.2V to +1.2V at a scan rate of 20 mV/s. Cyclic voltammogram data obtained for the EC device that used the iridium oxide film of the Comparative Example is shown in FIG. 1. Similar data obtained for the EC device that used the iridium oxide films of Examples 1 and 2 is depicted in FIGS. 2 and 3, respectfully.

TABLE 1

|  | EXAMPLE 1 | EXAMPLE 2 | COMPARATIVE EXAMPLE |
|---|---|---|---|
| ATOMIC NITROGEN, % | 11–13 | 11–13 | 8 |
| O:Ir | 3.3:1 | 3.3:1 | 2.8:1 |
| $T_p^*$, % (AS DEPOSITED) | 45 | 45 | 45 |
| $T_p$, % (BLEACHED) | 63 | 69 | 67 |

$T_p^*$ is the photopic transmittance

TABLE 2

| Layer Type and Thickness in Angstroms | EXAMPLE 1 | EXAMPLE 2 | COMPARATIVE EXAMPLE |
|---|---|---|---|
| Tungsten | 5100 | 2600 | 5100 |
| Iridium Oxide | 320 | 320 | 440–480 |
| ITO beneath Tungsten | 2600 | 1300 | 2600 |
| ITO beneath Iridium Oxide | 2600 | 2150 | 2600 |
| STABILITY | STABLE | STABLE | UNSTABLE |
| NUMBER OF CYCLES | 5,026 | 9,024 | 2682 |

Cycle 1 of FIG. 1 illustrates a typical stable electrochromic reaction. After 2,682 cycles, a secondary reaction is evident, as noted by the peaks present beyond the voltage range of −0.1 V during reduction of the iridium oxide film, and also around 0.35V during oxidation of the iridium oxide film. These peaks are illustrative of the presence of significant amounts of bubbles at the interface of the iridium oxide film and the ion conducting polymer in the EC device, and do not participate in the coloring and bleaching mechanisms.

Cycles 1, 3703, and 5026 of FIG. 2 are all typical of stable electrochromic reactions. No additional peaks were noted, only expansion of the cyclic voltammogram. This expansion reflected an increase of charge being transferred between the two electrochromic layers, with no sacrifice in robustness. Moreover, comparison of this iridium oxide-nitrogen chemistry to the Comparative Example shows that the higher oxygen:iridium ratio and higher nitrogen content contribute to a more stable electrochemical electrochromic device, where even a thicker film of iridium oxide in the Comparative Example did not improve durability, e.g., increasing charge capacity.

FIG. 3 illustrates the cyclic voltammogram (CV) of the EC device of Example 2 after various cycles. After ore than 9,000 cycles, the CV did not exhibit any secondary reactions. In addition, the stretching of the voltammogram as less than FIG. 2, which is believed to be due to educing the $WO_3$ thickness to 2600 Angstroms.

Part D

Figure 4:
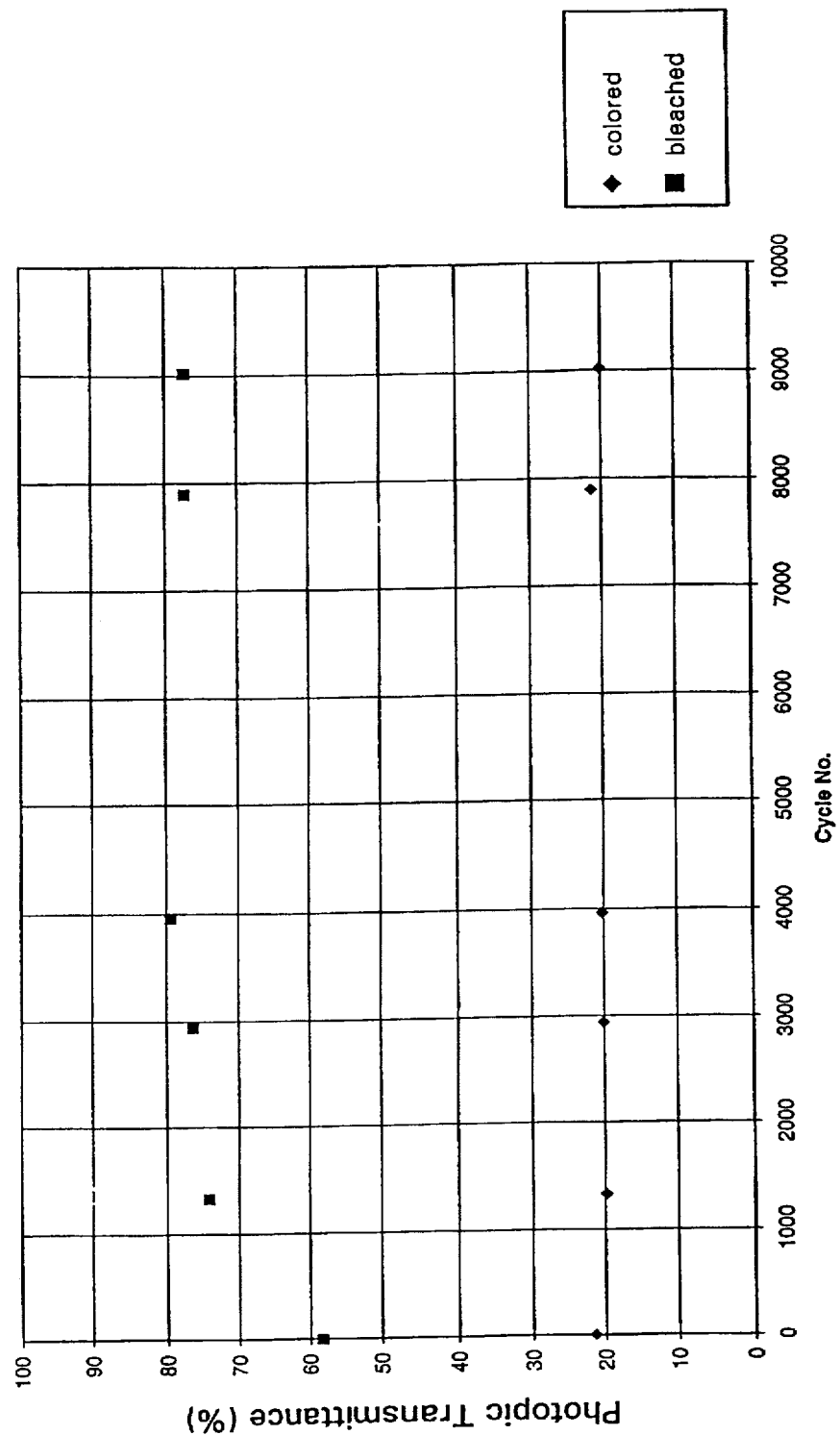
FIG. 4 is a chart of Transmittance vs. Cycle No. for the electrochromic device of Example 2.

FIGS. 4–7 depict the optical and electrical performance of an EC device prepared with the iridium oxide film of Example 2. The thicknesses of the various layers in the device are listed in Table 2. The device was prepared using the procedure of Part B. FIG. 4 shows that a photopic window of about 20–77% is maintained in excess of 7000 cycles. FIG. 5 indicates that a constant amount of charge is transferred between the EC layers over 9000 cycles. The cell resistance is also maintained, as seen by the steady peak current values in FIG. 6. Finally, in FIG. 7 the times to color and bleach the EC device do not vary by more than one second after 9000 cycles.

We claim:

1. An electrochromic article comprising:

(a) a first transparent substrate having disposed on a surface thereof a first layer of electroconductive tin-doped indium oxide, and a second layer disposed on said first layer of an electrochromic oxide selected from tungsten oxide and compounds of tungsten oxide;

(b) a second transparent substrate having disposed on a surface thereof a first layer of electroconductive tin-doped indium oxide, and a second layer disposed on said first layer of an electrochromic nitrogen-containing iridium oxide film, said iridium oxide film comprising iridium, oxygen and nitrogen, the ratio of atomic oxygen to iridium being from 3.2:1 to 3.4:1 and the amount of nitrogen present in the film being from about 11 to 13 atomic percent; and (c) an ion-conductive layer disposed between and in contact with said electrochromic tungsten oxide film and said iridium oxide film.

2. The electrochromic article of claim 1 wherein the tin-doped indium oxide layer on said first transparent substrate has a thickness of from 1200 to 3900 Angstroms, and wherein the tin-doped indium oxide layer on said second transparent substrate has a thickness of from 1300 to 3900 Angstroms.

3. The electrochromic article of claim 1 wherein the electrochromic tungsten oxide layer has a thickness of from 2400 to 5200 Angstroms, and the iridium oxide layer has a thickness of from 290 to 430 Angstroms.

4. The electrochromic article of claim 2 wherein the electrochromic tungsten oxide layer has a thickness of from 2400 to 5200 Angstroms, and the iridium oxide layer has a thickness of from 290 to 430 Angstroms.

5. The electrochromic article of claim 4 wherein the iridium oxide layer has a thickness of from 300 to 400 Angstroms.

6. The electrochromic article of claim 4 wherein the iridium oxide layer has a thickness of 320 Angstroms.

7. The electrochromic article of claim 4 wherein the tin-doped indium oxide layer on said first transparent layer substrate has a thickness of 1200 to 2600 Angstroms, the tin-doped indium oxide layer on said second transparent layer has a thickness of 2100 to 2200 Angstroms, the tungsten oxide layer has a thickness of 2500 to 3900 Angstroms, and the iridium oxide layer has a thickness of 300 to 400 angstroms.

8. The electrochromic article of claim 1 wherein said first and second transparent layers are selected from glass and organic polymers.

9. The electrochromic article of claim 8 wherein the first and second transparent layers are optically transparent organic polymers and wherein an adhesion improving primer is situated between and in contact with each electroconductive layer and the adjacent transparent organic polymer.

10. The electrochromic article of claim 9 wherein the tin-doped indium oxide layer on said first transparent substrate has a thickness of from 1250 to 1350 Angstroms, the electrochromic tungsten oxide layer has a thickness of from 2500 to 3900 Angstroms, the tin-doped indium tin oxide layer on said second transparent substrate has a thickness of from 2100 to 2200 Angstroms, and the iridium oxide layer has a thickness of from 290 to 430 Angstroms.

11. The electrochromic article of claim 10 wherein the organic polymer is a polymerizate comprising diethylene glycol bis(allyl carbonate).

12. An electrochromically active iridium oxide film comprising iridium, oxygen and nitrogen, the ratio of atomic oxygen to iridium being from 3.2:1 to 3.4:1, and the amount of nitrogen present in the film being from about 11 to 13 atomic percent.

13. The electrochromically active iridium oxide film of claim 12 wherein the film has a thickness of from 290 to 430 Angstroms.

14. The electrically active iridium oxide film of claim 12 wherein the film has a thickness of from 300 to 400 angstroms.

15. The electrochromically active iridium oxide film of claim 12 wherein the ratio of atomic oxygen to iridium is 3.3:1.

16. The electrochromically active iridium oxide film of claim 12 wherein the density of the film is from 55 to 65 percent of the theoretical value of iridium dioxide.

17. The electrochromically active iridium oxide film of claim 16 wherein the density of the film is from 60–65 percent.

* * * * *